United States Patent [19]

Gash

[11] 4,355,076

[45] Oct. 19, 1982

[54] DRY LAMINATION

[75] Inventor: Duggan J. Gash, Lower Froyle, near. Bentley, England

[73] Assignee: Koninklijke Emballage Industrie Van Leer, B.V., Amstelveen, Netherlands

[21] Appl. No.: 935,007

[22] Filed: Aug. 18, 1978

Related U.S. Application Data

[63] Continuation of Ser. No. 820,893, Aug. 1, 1977, abandoned.

[30] Foreign Application Priority Data

Aug. 4, 1976 [GB] United Kingdom ............... 32559/76

[51] Int. Cl.$^3$ ............................. B32B 9/04; C09J 5/02
[52] U.S. Cl. ................................. 428/411; 156/308.2; 156/324; 428/461; 428/515; 428/516
[58] Field of Search ...................... 156/306, 324, 308.2; 427/385 B, 388 R; 428/461, 516, 515, 411; 264/248; 93/DIG. 1; 229/3.5 R

[56] References Cited

U.S. PATENT DOCUMENTS

| | | | |
|---|---|---|---|
| 2,367,725 | 1/1945 | Lindh et al. | 156/306 |
| 2,537,666 | 1/1951 | Gowing | 156/306 |
| 2,709,148 | 5/1955 | Jacque' | 156/306 |
| 2,719,100 | 9/1955 | Banigan | 156/306 |
| 3,087,845 | 4/1963 | Patterson | 156/306 |
| 3,457,139 | 7/1969 | James | 156/324 |
| 3,471,353 | 10/1969 | Rasmussen | 428/516 |

FOREIGN PATENT DOCUMENTS 710289  5/1965  Canada ............................... 428/461

*Primary Examiner*—John J. Gallagher
*Attorney, Agent, or Firm*—Stevens, Davis, Miller & Mosher

[57] ABSTRACT

A two-step method of laminating at least two plastic films of same or different nature, comprising contacting intimately said films at a temperature in the range from ambient up to the melting temperature of the film having the lowest melting point of said films in order to form a low peel strength composite, and subsequently subjecting the composite to a treatment at a temperature within the range from 60° to 180° C., the 60° to 180° C. temperature being below the melting or softening temperature of the constituents in the composite having the lowest melting or softening temperature, in order to form a high peel strength laminate, non-surface treated films being used and the composite of the first step being subjected to the treatment of the second step in a condition substantially free of tension and pressure.

10 Claims, No Drawings

DRY LAMINATION

This is a continuation of application Ser. No. 820,893 filed Aug. 1, 1977, now abandoned.

The present invention is concerned with a two-step method of laminating at least 2 plastic films of same or different nature, comprising contacting intimately said films at a temperature in the range from ambient up to the melting temperature of the film having the lowest melting point of said films in order to form a low peel strength composite, and subsequently subjecting said composite to a treatment at an elevated temperature in same range in order to form a high peel strength laminate.

British Patent Specification No. 1,055,803 recognises that when polypropylene is oriented, its ability to adhere to itself by the application of heat and pressure, i.e. its heat scalability, is inadequate and unsatisfactory for many applications, and this specification describes a method of producing a biaxially oriented polypropylene film having a layer of a heat-sealable thermoplastic polymer bonded thereto. In order to avoid pre-treatment of the polypropylene film or complicated methods of applying the heat-sealable thermoplastic polymer from solution, the method of this specification teaches bringing a polypropylene film into close, but readily delaminable, contact with a heat-sealable non-oriented thermoplastic film and stretching the composite at an elevated temperature to obtain interfacial adhesion and thus bond the films together. The polypropylene film used is preferably a monoaxially oriented film and the composite is preferably stretched in a direction different from the direction of orientation of the polypropylene film so that in the final product, the polypropylene is biaxially oriented.

In the method of this specification, the films may be brought together by passing them through a pair of pressure rolls. The composite is then passed through one or more heating zones in which it is heated and stretched, at least transversely, and maintained under transverse and longitudinal tension.

British Patent Specification No. 1,145,199 describes an improvement in the method of Specification No. 1,055,803, the improvement lying in the use, as the heat-sealable thermoplastic film, of an ethylene/propylene copolymer film prepared from a monomer mixture containing 2 to 6% by weight of ethylene, the balance being essentially polypropylene.

U.S. Pat. No. 3,360,412 of James describes a process for dry laminating dissimilar thermoplastic films without the use of an adhesive; in this process, prior to laminating, the contiguous surfaces of the films are subjected to an electrical discharge pretreatment.

U.S. Pat. No. 4,008,352 discloses a process of heat-laminating thermoplastic films by contacting the surfaces of these films, which were previously subjected to a corona discharge treatment, using a niproll assembly of which at least one roll has a temperature higher than the temperature required to obtain a "low peel strength laminate", but lower than the temperature at which the laminate adheres to said heated roll.

In a next step the laminate is passed through a heated zone, said zone being at a temperature at least as high as the temperature of the heated roll, and then the laminate, now being a "high bondstrength laminate" is cooled.

Thus, in both processes the films to be used should be subjected to an imperatively required pretreatment, before they can be subjected to a dry-lamination.

Other known methods of laminating without the use of adhesives are subject to one or more disadvantages, such as giving rise to insufficient bond strengths or requiring very high rolling pressures which result in unacceptable deformation of the films, or loss of orientation in pre-oriented films when high temperatures are used.

It was found now, that laminates having good peel strengths can be made by contacting intimately at least 2 non-surface-treated plastic films of same or different nature at a temperature in the range from ambient up to the melting temperature of the film having the lowest melting point of said films in order to form a low peel strength composite, and subsequently subjecting said composite in a condition substantially free of tension and pressure to a treatment at an elevated temperature in same range of temperatures in order to form a high peel strength laminate. Preferably the temperature used for the second step is just below, the softening or melting temperature of the film having the lowest softening or melting temperature.

Preferably at least one of the films of the composite is monoaxially oriented and, more preferably, at least two of the films are monoaxially oriented. In the composite, the direction of orientation of one of the films being at an angle, preferably 90°, to the direction of orientation of the other film(s).

Since the composite is subjected only to temperatures below the melting or softening temperatures of the constituents the orientations in the films making up the laminate is not affected. For packaging applications, the thickness of the laminate is preferably from 10 to 300 µm, more preferably from 20 to 100 µm. For other applications laminates of same or different thicknesses may be utilised.

The initial intimate contacting of the films is preferably effected by passing them through a pair of pressure rolls, but other means may be used as well. When pressure rolls are used, the pressure between the rolls is not critical, but should be such that an intimate contact between the films is obtained without undue deformation of the films. This means that the linepressure can be as low as 0.1 N/cm, but can go up to 1000 N/cm. The temperature at this stage of the process is preferably from 80° to 120° C., but lower temperatures may be utilised as well, even ambient temperatures provide good results.

The composite obtained can usually be quite readily delaminated by simply manually stripping the layers apart, the degree of adhesion of the layers depending on the film materials used and the laminating conditions.

The postheating step is carried out, for example, by passing the composite through an oven or over one or more heated cylinders or rolls. The temperature used in this stage is preferably from 60° to 180° C., depending on the foil materials used. The time for postheating being not critical as long as the composite is heated sufficiently long so that throughout its thickness the desired temperature is reached, that is below or just below the temperature which is the melting or softening temperature of the constituents in the composite having the lowest melting of softening temperature. The resulting laminate shows greatly improved interlayer adhesion, as compared with that of the composite prior to the postheating step.

It is preferred that at least one of the films of the laminate should be formed of a thermoplastic polymer; such films can be produced by any suitable conventional process, such as tubular blowing or flat extrusion, flat casting or calendering. Suitable films include, for example, films of homo- or co-polymers of ethylene, polypropylene, polystyrene, polyvinyl chloride, polyvinylidene chloride, polyvinyl alcohol, and ethylene/vinyl acetate copolymers. Metal foils can also be used. The most preferred film materials are monoaxially oriented polypropylene and monoaxially oriented high density polyethylene.

In order that the invention may be more fully understood, the following examples are given by way of illustration only

EXAMPLE 1

A cross-laminate was made by passing two monoaxially oriented polyethylene films having their directions of orientation at an angle of 90°, through a pair of pressure rolls at a line pressure of 200 N/cm. The polyethylene was Unifos 2900, a high density polyethylene having a melting point of 133° C. The thickness of the films was 50 μm. No pretreatment whatsoever was given to the surfaces of the film prior to the lamination process.

The resulting composite having a thickness of 100 μm was easily delaminable, and was postheated at a temperature of about 130° C. for about 5 minutes in an oven, without the application of pressure and with the composite being in a substantially tension-free condition.

The peel strength of the composite after passing through the pressure rolls was 4 N/m and that of the laminate after postheating was 150 N/m, the degree of orientation in the final cross laminate being not less than the orientation of the monoaxially oriented films before the laminating operation.

Peel strength was tested as follows

A specimen of 20 mm width was peeled using an Instron tensiometer, the crosshead speed being 500 mm/min, giving a peel line speed of 250 mm/min. The force needed to peel the specimen was recorded. The specimen configuration was such that the two free ends were colinear, the unpeeled portion was supported lightly so that it remained perpendicular to the free ends.

The test was carried out at 20° C. and at a relative humidity of 65%.

EXAMPLE 2

Three laminates were prepared from high density polyethylene film (Unifos 2900) by initially passing two super imposed films through a steel rolling mill at a pressure of 1000 N/cm at room temperature. No pretreatment was given to the film surfaces before laminating.

The composite produced was found to have a peel-strength of less than 2 N/m.

The laminate was then post-heated at 125° C. by passing it over a heated roller, the contact time was less than 10 seconds.

The three laminates prepared by this procedure were found to have peel strengths as follows:

| Sample no. | Peelstrength in N/m |
|---|---|
| 1 | 20–55 |
| 2 | 40–50 |
| 3 | 50–70 |

EXAMPLES 3 TO 16

Cross-laminates were made by passing 2 or 3 films through a pair of pressure-rolls, at a line pressure of 200 N/cm. The polypropylene film used was GPE 102 of ICI. The high density polyethylene film was Vestolen 6042 of Hüls, and the Nylon film was Rilsan of Aquitaine.

The thickness of the films was 50 microns. No pretreatment whatsoever was given to the surfaces of said films prior to the lamination process. The resulting easily delaminable composites having a thickness of 100 μm were subjected to a post-heating step at temperatures stated in the undermentioned table by passing them over a heated roller, for a contact period of 10 to 15 seconds.

| Ex. | Film materials | Compositing temp. | Average peel strength after compositing in N/m | Postheating temp. | Average peel strength after postheating in N/m |
|---|---|---|---|---|---|
| 3 | Cross-laminate consisting of 2 layers of monoaxially oriented polypropylene, prepared according to the process described in British Patent 1,414,785 | 110° C. | 5 | 152° C. | Could not be peeled due too high bond strength |
| 4 | Cross-laminate consisting of 2 layers of monoaxially oriented high density polyethylene, prepared according to the process described in British Patent 1,414,785 | 110° C. | 3 | 124° C. | 60 |
| 5 | Cross-laminate as described in British Patent 792,976, consisting of 2 layers of monoaxially oriented polypropylene | 110° C. | 3 | 150° C. | 260 |
| 6 | Cross-laminate as described in British Patent 792,976, consisting of 2 layers of monoaxially oriented high density polyethylene | 110° C. | 4 | 127° C. | 15 |
| 7 | Laminate consisting of one | 110° C. | 6 | 147° C. | Could not be peeled due |

| | | | Average peel strength after compositing in N/m | | |
|---|---|---|---|---|---|
| Ex. | Foil materials | Compositing temp. | | Postheating temp. | Average peel strength after postheating in N/m |
| | layer of non-oriented polypropylene and a layer of monoaxially oriented polypropylene, prepared according to the process described in British Patent 1,414,785 | | | | too high bond strength |
| 8 | Laminate consisting of one layer of non-oriented high density polyethylene and a layer of monoaxially oriented high density polyethylene prepared according to the process described in British Patent 1,414,785 | 110° C. | 10 | 120° C. 125° C. | 30 65 |
| 9 | Laminate consisting of one layer of non-oriented polypropylene and a layer of monoaxially oriented polypropylene, prepared according to the process described in U.S. Pat. No. 2,943,356 | 110° C. | 65 | 150° C. | 250 |
| 10 | Laminate consisting of one layer of non-oriented high density polyethylene and a layer of monoaxially oriented high density polyethylene, prepared according to the process described in U.S. Pat. No. 2,943,356 | 110° C. | 30 | 124° C. | 105 |
| 11 | Laminate consisting of 2 layers of non-oriented polypropylene | 112° C. | 80 | 147° C. | 140 |
| 12 | Laminate consisting of 2 layers of non-oriented high density polyethylene | 104–112° C. | 15 | 122° C. | 45 |
| 13 | Laminate consisting of 3 layers of non-oriented high density polyethylene | 110° C. | 15 32 | 118° C. | 60 120 |
| 14 | Laminate consisting of 2 layers of nylon-11. | 114° C. | 2,5 | 160° C. 165° C. | 32,5 175 |
| 15 | Laminate consisting of one layer of nylon-11 and one layer of aluminium foil | 110° C. | 5 | 169° C. | 30 |
| 16 | Laminate consisting of one layer of polypropylene one layer of high density polyethylene and a further layer of high density polyethylene | 110° C. | 2,5 2,5 | 131° C. | 50 PE could not be peeled |

What we claim is:

1. A two-step method of laminating at least two plastic films of same or different nature, comprising contacting intimately said films by means of pressure rolls at a temperature in the range from ambient up to the melting temperature of the film having the lowest melting point of said films in order to form a low peel strength composite, and subsequently subjecting said composite to a treatment at a temperature within the range from 60° to 180° C., said 60° to 180° C. temperature being below the melting or softening temperature of the constituents in the composite having the lowest melting or softening temperature, in order to form a high peel strength laminate, non-surface treated films being used and the composite of the first step being subjected to the treatment of the second step in a condition substantially free of tension and pressure.

2. The method according to claim 1, wherein intimate contact is obtained at a temperature ranging from ambient to just below the melting points of the materials of the composite.

3. The method according to claim 1, wherein the postheating time is less than 60 seconds.

4. The method according to claim 1, wherein at least one of the films of said composite is a thermoplastic film.

5. The method according to claim 1, wherein at least one component of the composite is a monoaxially oriented film.

6. The method according to claim 1, wherein at least one of the films of said composite is monoaxially oriented polypropylene.

7. The method according to claim 1, wherein at least one of the films of said composite is monoaxially oriented high density polyethylene.

8. The method according to claim 1, wherein one of the films used in said composite is a metal foil.

9. The method according to claim 1, wherein at least two monoaxially oriented thermoplastic films are used in said composite, the orientation directions of which are not parallel.

10. A laminate prepared according to claim 1.

* * * * *